(No Model.)
J. REECE.
CLUTCH MECHANISM.
No. 363,421. Patented May 24, 1887.
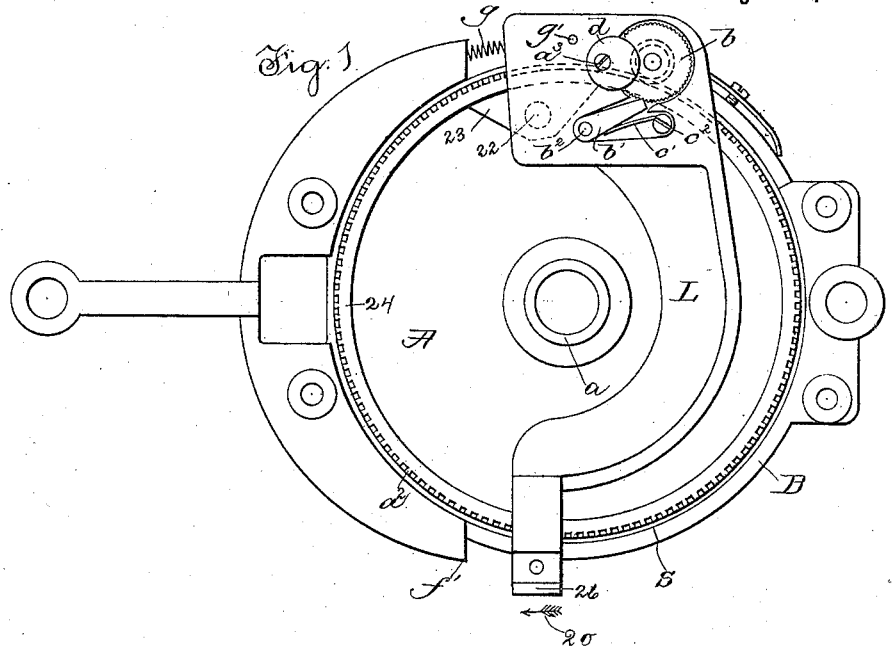
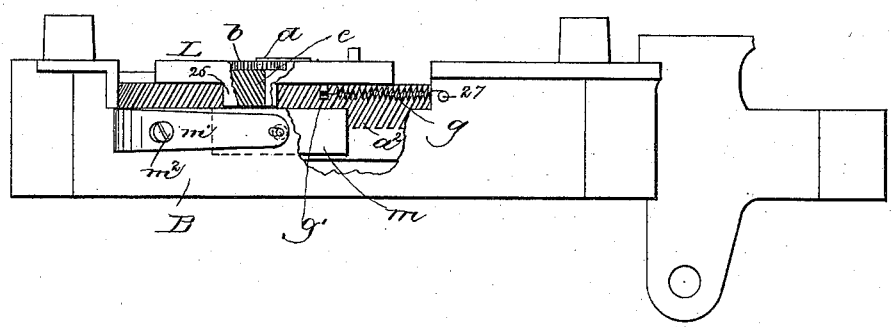
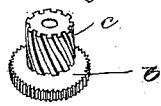
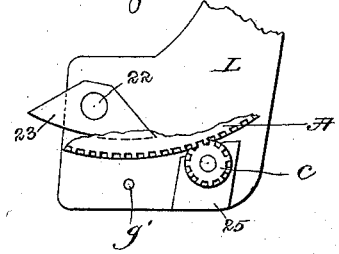
Witnesses
F. L. Emery
John F. C. Prindle
Inventor
John Reece
by Crosby & Gregory, attys.

UNITED STATES PATENT OFFICE.

JOHN REECE, OF BOSTON, MASSACHUSETTS.

CLUTCH MECHANISM.

SPECIFICATION forming part of Letters Patent No. 363,421, dated May 24, 1887.

Application filed September 21, 1886. Serial No. 214,156. (No model.)

*To all whom it may concern:*

Be it known that I, JOHN REECE, of Boston, county of Suffolk, and State of Massachusetts, have invented an Improvement in Clutch Mechanisms, of which the following description, in connection with the accompanying drawings, is a specification, like letters on the drawings representing like parts.

My invention has for its object to improve that class of clutch mechanisms employed to produce an intermittent rotary movement from a vibratory movement of a lever; and it consists, essentially, of a toothed wheel, having a rim to be engaged by a toothed hub carried by a vibrating lever, the said hub having a connected ratchet-wheel which is acted upon by a pawl, also carried by the said lever, the toothed hub positively engaging and holding the toothed wheel when the lever is moved in one direction, but slipping or moving freely over the said wheel when the lever is being moved in the opposite direction, as will be described.

Figure 1 is a top or plan-view of a detached part of a machine embodying my invention; Fig. 2, a side elevation of Fig. 1, partially broken out to more clearly show the operative parts, and Figs. 3 and 4 details to be referred to.

The wheel or disk A, to be rotated intermittingly, is herein shown as provided at its periphery with teeth $a^2$, the said wheel or disk being shown as loosely mounted on a hub, $a$, of a supporting frame or case, B.

The vibrating lever L, used to rotate the wheel A intermittingly, is enlarged at one end, as shown, and at its under side is provided with a stud, 22, (see Figs. 1 and 3,) which receives upon it loosely a shoe, 23, having a convexed face which rests in contact with the concaved interior of the rim 24 of the wheel A, the said lever also having at its under side a lug, 25, which lug, as well as the said lever, is bored for the reception of a ratchet-toothed wheel, $b$, having a toothed hub, $c$, the under side of the wheel $b$ resting against the lever L, the periphery of the toothed hub $c$ engaging the teeth at the periphery of the said wheel A.

The hub $c$ and the shoe 23 come against the outer and inner sides of the rim of the wheel A, at such distances apart that the said hub $c$ and shoe 23 act to bind the said rim and turn the wheel when the lever is moved in the direction of the arrow 20, but slipping freely over the rim and leaving the wheel at rest when the lever is moved in the opposite direction.

The lever L may be moved by pressure against its end 26, as in my patent of the United States, No. 240,546, dated April 26, 1881, to which reference may be had.

The machine shown by my patent just referred to is a button-hole sewing-machine; but I do not wish to be understood as limiting my invention to use in connection with such a machine, as it is capable of use in a loom or printing-press or any other machine in which it may be desired to impart a strong intermittent rotary movement to a wheel from a vibrating lever.

When the lever L is to be moved to cause the wheel A to be rotated, power will be applied to its end, 26, and the pressure will be in the direction of the arrow 20; but when the movement of the lever L is to be reversed and the shoe 23 and hub $c$ are to slip loosely along the rim of the wheel and not rotate it, the power will be applied to the opposite end of the said lever, the said power, as herein shown, being exerted for such purpose by the spring $g$, one end of which is attached to a stud, $g'$, extended from the lever L, the other end of the spring being hooked to a stud, 27, of the frame B.

The ratchet-wheel $b$ is held down in place in the lever L by a turn-button or disk, $d$.

Should a shoe like the one 23, except that it should have a concaved face, be used instead of the hub $c$, as has been done, the movement of the wheel is not always positive.

To make the movement of the wheel always the same under a given stroke of the lever L, I have employed the ratchet $b$ and the hub $c$. This ratchet is herein shown as engaged by a single pawl, $b'$, pivoted at $b^2$, it being kept in engagement with the said ratchet by a spring, $c'$.

The teeth of the hub $c$, herein shown as spiral, engage teeth of the wheel A, also shown as spiral, and with the parts so constructed the teeth of the hub $c$ act to engage and positively carry with it and the lever L, as the latter is moved, the wheel A, the pawl $b'$ preventing any rotation of the hub $c$ as the lever L is moved in the direction of the arrow 20; but when the lever L is being moved in the opposite direction by the spring $g$ the hub $c$ and ratchet are rotated, the latter clicking under the said pawl.

I desire it to be understood that the teeth of the hub $c$, as well as those of the wheel A, may be straight, or of the usual shape, instead of spiral, and so also I may employ more than one pawl $b'$, if it is desired that the movement to be imparted to the wheel A be very fine—as, for instance, should I employ three pawls the teeth would be enlarged, but reduced in number, and at no time would more than one tooth be effective as a holding-tooth, as is well understood.

To prevent any liability of the wheel A being rotated except as it is rotated positively by the lever L, or to prevent over running of the wheel A by momentum, it may be acted upon by any usual friction device.

As herein illustrated, I have shown a friction device composed of a block, $m$, acted upon by a spring, $m'$, made adjustable by a screw, $m^2$.

It will also be understood that I may, if desired, employ a second hub, $c$, instead of the shoe 23, the inner portion of the rim of the wheel A in such case being also toothed.

I claim—

1. The combination, with a toothed wheel and a vibrating lever to rotate it intermittingly, of a toothed hub carried by the said lever and engaging the said toothed wheel, and with a ratchet-wheel and pawl to prevent the rotation of the said toothed hub when the lever is moved in one direction, the said hub acting to carry the said wheel positively with the said lever, substantially as described.

2. The combination, with a toothed wheel and a vibrating lever to rotate it intermittingly, of a toothed hub carried by the said lever and engaging the said toothed wheel, and provided with a ratchet-wheel and pawl to prevent the rotation of the said toothed hub when the lever is moved in one direction, the said hub acting to carry the said wheel positively with the said lever, and with a friction device to prevent excess of movement of the said toothed wheel, substantially as described.

In testimony whereof I have signed my name to this specification in the presence of two subscribing witnesses.

JOHN REECE.

Witnesses:
G. W. GREGORY,
F. L. EMERY.